United States Patent [19]

Fimml

[11] Patent Number: 5,281,897
[45] Date of Patent: Jan. 25, 1994

[54] METHOD FOR OPERATION OF A CATHODE USING THE TUNNELLING EFFECT AND A CATHODE CONFIGURATION FOR EXECUTION OF THE METHOD

[76] Inventor: Hans Fimml, Klausener Strasse 4, A-6020 Innsbruck, Austria

[21] Appl. No.: 967,566

[22] Filed: Oct. 28, 1992

Related U.S. Application Data

[63] Continuation of Ser. No. 784,911, Oct. 30, 1991, abandoned.

[30] Foreign Application Priority Data

Oct. 30, 1990 [DE] Fed. Rep. of Germany ....... 4034487

[51] Int. Cl.$^5$ .......................... H05B 41/14; H01J 1/30
[52] U.S. Cl. ...................................... 315/94; 315/105; 257/30
[58] Field of Search ................. 315/32, 94, 97, 105, 315/106, 246; 313/450, 346 R, 346 DC, 446, 447, 448, 449; 257/30, 10

[56] References Cited

U.S. PATENT DOCUMENTS

| | | | |
|---|---|---|---|
| 3,359,466 | 12/1967 | Pollack et al. | 357/30 X |
| 3,447,045 | 5/1969 | Hickmott | 257/30 |
| 3,913,218 | 10/1975 | Miller | 257/10 X |
| 4,005,465 | 1/1977 | Miller | 257/10 |
| 4,150,318 | 4/1979 | Kerstetter | 313/340 |
| 4,151,440 | 4/1979 | Buescher | 313/346 R X |

*Primary Examiner*—David Mis
*Attorney, Agent, or Firm*—Penrose Lucas Albright

[57] ABSTRACT

A cathode that uses the tunneling effect of electrons through a layer of insulation consisting of alpha alumina in combination with a circuit to provide a pulsed current caused by a current interrupter within a frequency range of one to ten KHz.

7 Claims, 1 Drawing Sheet

METHOD FOR OPERATION OF A CATHODE USING THE TUNNELLING EFFECT AND A CATHODE CONFIGURATION FOR EXECUTION OF THE METHOD

This is a continuation of application Ser. No. 07/784,911, filed Oct. 30, 1991, abandoned.

FIELD OF THE INVENTION

The present invention involves cathodes that make use of the tunneling effect of electrons through a layer of insulation and, in particular, through a layer of insulating material capable of withstanding a high intensity electric field for inducing the electron current therethrough, while being sufficiently thin to permit a useful tunneling current flow. Such cathodes have been long known, are described in numerous publications; they include a base metal, an insulation layer applied to that base, and a covering layer applied over the insulation layer.

BACKGROUND OF THE INVENTION

If an electric potential is established between base and cover layers, then a cathode current is discharged through the cover layer provided the layers' thicknesses are correctly dimensioned. Although this type of cathode is, in theory, of relatively simple construction and capable of providing remarkable advantages compared with a barium cathode, it has encountered considerable difficulties in practical application. To obtain a useful flow of electrons through the insulation and cover layers, these layers must be extremely thin, and, at the same time, the insulation layer must be able to withstand a high electric field intensity without breakdown, flashover or sparking.

In an earlier publication, K. M. Tischer determined that a field intensity level of approximately $5 \times 10^6$ V/cm is required. On the other hand, in the "MEAD" research, an emission of approximately 10 lambda/cm$^2$ is disclosed as attainable.

An aluminum oxide layer ($Al_2O_3$) is generally employed as an insulation layer having sufficient resistance and strength characteristics. Unfortunately, aluminum oxide, being a good adsorbent, is quite hygroscopic and because of this, is virtually useless as a practical matter if it operates in a region wherein water vapor may be present.

Thus other materials have been generally preferred. For example, European Patent 262 676 A2 discloses an insulation layer that is composed of special organic substances or a combination of an organic and an inorganic layer. Nevertheless, a need exists for a tunneling cathode wherein a sufficiently thin insulating layer coexists with the high electric field intensity requisite to produce a tunneling effect which more nearly approaches that theoretically possible.

The following is a list of publications which are relevant to the state of the art and the background of the instant invention, such publications being incorporated herein by reference:

C. A. Mead, J. Appl. Phys. 32, 646 (1961)
J. P. Spratt, R. P. Schwarz, and W. M. Kane, Phys. Rev. Letter 6, 341 (1961)
H. Thomas, Z. Physik 147, 395 (1957)
W. G. Spitzer, C. R. Crowell, and M. M. Atalla, Phys. Rev. Letters 8, 57 (1962)
C. A. Mead, Phys. Rev. Letters 8, 56 (1962)
J. C. Fisher and I. Giaver, Appl. Phys. 32, 172 (1961)
J. T. Advani, M.S. Thesis, MIT (May 1961)
R. M. Handy, Phys. Rev. 126, 1968 (1962)
K. M. Tischer, Telefunken AG, Röhrenwerk Ulm-/Donau
C. E. Horton and J.W. Hall, GE-Technical Inf. Series
C. Mead, Phys. Rev. 128, 2088 (1962)
W. Haas and R. Johannes, Brit. J.appl. Phys. 14, 286 (1963)
R. Fowler and L. Nordheim, Proc. Soc. A 119, 173 (1928)
J. Bardeen, Phys. Rev. 71, 717 (1947)
H. Kanter and W. A. Feibelman, J.appl. Phys. 33, 3580 (1962)

SUMMARY OF THE INVENTION

To meet the needs discussed above, according to the invention, a diode current is converted into short current pulses of about one to ten KHz. A circuit interrupter or pulse generator with sufficiently high disconnection frequency within that frequency range is connected in the diode circuit for this purpose. Systems for generating pulses that provide abrupt disconnections are preferred such as obtained by electrolytic circuit breakers, electronic circuits, including multivibrators, Schmitt triggers, and others which will be considered suitable by those skilled in the art. However, inasmuch as the operation of an electrolytic circuit interrupter necessitates voltage and current levels which are too high, a voltage divider is connected in the circuit, and from this is drawn a voltage which ca be tolerated without causing breakdown or flashover of the cathode using the tunneling effect. The possible amperage is then governed by such voltage and the resistance of the cathode which, in turn, is governed by the nature and thickness of the various layers.

A test carried out on this arrangement yielded an approximately forty-fold improvement in comparison with a value for a comparable component disclosed in the prior art.

DESCRIPTION OF THE PREFERRED EMBODIMENTS

Figure 1:
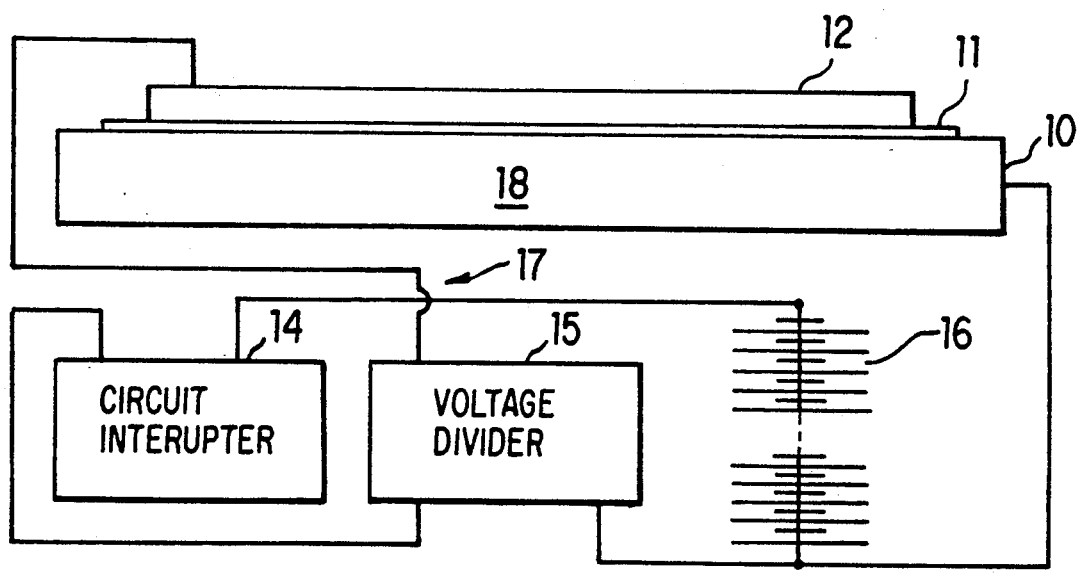
FIG. 1 is a diagrammatic illustration of the invention described herein.

Prior art cathodes of a type that employ the tunneling effect, and which are composed of an aluminum with an insulation layer applied thereto, have experienced problems because the insulation layer is composed of gamma-$Al_2O_3$ and therefore is an adsorbent which is hygroscopic, and, in addition, is sensitive to acids. It has been discovered, however, that these disadvantages are not present if the layer is modified so that it is composed of alpha-$Al_2O_3$. The result is a stable, relatively insensitive cathode, and, accordingly, modifying the gamma-$Al_2O_3$ to an alpha-$Al_2O_3$ has proved quite advantageous.

To accomplish the gamma to alpha alumina transformation, a very pure aluminum is vapor-deposited on a heat-resistant bottom layer metal 10 of tantalum, or other suitable heat-resistant metal, to be utilized as a base, and the aluminum layer is then oxidized. The oxidized alumina layer 11, which is initially gamma-$Al_2O_3$, is converted to alpha-$Al_2O_3$ by placing the cathode with the gamma-$Al_2O_3$ layer in a vacuum of $10^{-4}$ to $10^{-5}$ millibars and electrically heating same to 1000° C.

for a sufficient period of time to effect the transformation, at least about ten minutes, in the vacuum. Thereafter, the cathode is removed from the vacuum, allowed to cool, and a further layer 12 of very pure aluminum, gold, silver or platinum is vapor-deposited thereon. The thickness of the insulating layer should be in a range of about 10 to 150 Ångströms, preferably 150 Ångströms and the thickness of the cover layer should be in a range of about 100 to 500 Ångströms, preferably 300 Ångströms. The arrangement described in the above Summary of the Invention is illustrated diagrammatically in FIG. 1. The current interrupter or pulse generator is indicated by reference numeral 14, the voltage divider by 15, an appropriate d.c. power source by 16, and the electric circuit generally by 17. The cathode (which, of course, is suitably electrically biased by means not specifically shown) is generally designated by reference numeral 18 and consists of layers 10, 11, and 12 described above.

A very durable cathode using the tunneling effect is obtained upon application of a suitably thin cover layer as described above.

The foregoing description has been provided for an understanding by those skilled in the art of the best mode of carrying out the invention as incorporated in the preferred embodiments disclosed above. Nevertheless, no unnecessary limitations should be understood therefrom, inasmuch as various modifications and equivalents of various aspects of the invention will be obvious to those skilled in the art with the disclosure herein before them.

Having disclosed my invention, what I claim as new and to be secured by Letters Patent of the United States is:

1. A cathode that uses the tunneling effect, the cathode comprising a first metal base layer, an insulation layer formed on said first metal base layer, a second metal cover layer formed on said insulation layer, an electric field voltage between said first and second metal layers sufficient to cause said second metal layer to emit electrons by the tunneling of said electrons through said insulation layer in the presence of said electric field, and a circuit connected to said first and second metal layers, said circuit including electric current interrupter means to provide abrupt electric current connections and disconnections in pulses in a frequency range of one to ten KHz through said circuit and said first and second metal layers and said insulation layer via the effect of said electric field, said insulation layer comprising alpha alumina.

2. A cathode in accordance with claim 1, comprising a voltage divider connected into the circuit for limiting a voltage across said insulation layer to that level which is tolerable to said insulation layer.

3. A cathode in accordance with claim 1, wherein said circuit interrupter comprises a pulse generator.

4. A cathode in accordance with claim 1, wherein said circuit interrupter comprises an electronic chopper.

5. A cathode in accordance with claim 1, wherein said current interrupter comprises a Schmitt trigger.

6. In a method for increasing the electrical current carrying capacity of a cathode using the tunneling effect which comprises the passage of an electrical current between a metal support layer and a metal cover layer via an insulation layer induced by an electric field provided between said metal support layer and said metal cover layer, the use of alpha alumina as said insulation layer.

7. A method in accordance with claim 6, wherein said method comprises pulsing the electrical current passing between said metal support layer and said metal cover layer in a frequency range of one to ten KHz by a current interrupter.

* * * * *